United States Patent [19]
Yoshikawa et al.

[11] Patent Number: 5,756,111
[45] Date of Patent: May 26, 1998

[54] PROCESS FOR PRODUCING ARTICLES OF REGENERATED CHITIN-CHITOSAN CONTAINING MATERIAL AND THE RESULTING ARTICLES

[75] Inventors: Masatoshi Yoshikawa; Takehiko Midorikawa, both of Kakogawa; Toru Otsuki, Kyoto; Taro Terashi, Nishinomiya, all of Japan

[73] Assignees: Omikenshi Company Limited, Osaka; Koyo Chemical Company Limited, Tokyo, both of Japan

[21] Appl. No.: 730,205

[22] Filed: Oct. 15, 1996

[30] Foreign Application Priority Data

Mar. 1, 1996 [JP] Japan ................................ 8-071199

[51] Int. Cl.$^6$ ............................ A01N 25/34; A61L 15/16
[52] U.S. Cl. ........................ 424/402; 424/443; 424/445; 424/446; 424/447; 604/289; 604/304
[58] Field of Search ............................ 424/402, 443, 424/445, 446, 447; 604/289, 304

[56] References Cited

U.S. PATENT DOCUMENTS

| 4,929,722 | 5/1990 | Sartain, III et al. | 536/20 |
| 4,960,413 | 10/1990 | Sagar et al. | 604/289 |

OTHER PUBLICATIONS

Chitin, Riccardo A.A. Muzzarelli, Pergamon Press Ltd., New York (1977), pp. 126–129, 228–239.

*Primary Examiner*—Thurman K. Page
*Assistant Examiner*—Kathryne E. Shelborne
*Attorney, Agent, or Firm*—Wenderoth, Lind & Ponack

[57] ABSTRACT

The present invention provides fiber materials, knits and textiles, nonwoven fabrics, miscellaneous daily goods or foam materials having an improved dyeability, biocompatibility, anti-microbial activity, good bio-degradative property, and being effective for deodorizing uses, growth enhancing uses for plants and medical uses, and having anti-microbial effect produced from the chitin-chitosan viscose which is produced by a xanthogenation reaction of alkaline chitin-chitosan having a different DAC ratio through a pre- and post-immersion steps in an NaOH solution, or from a viscose in which chitin-chitosan and cellulose are solubilized. In the process for producing chitin-chitosan/cellulose fibers, films or foam materials from the chitin-chitosan/cellulose viscose, chitin-chitosan in which DAC ratio and degree of polymerization are adjusted is formed through an improved pre-immersion step in which the chitin material is immersed in a NaOH solution of high concentration at high temperature and through an improved post-immersion step in which the temperature is decreased. The chitin-chitosan/cellulose viscose is produced by a xanthogenation reaction with $CS_2$ and by dissolving in crushed ice. The viscose obtained or a viscose in which chitin-chitosan and cellulose are solubilized in a desired ratio is used for producing fibers or films, and the viscose in which a foaming agent is added is used for producing foam materials. Span-lace process nonwoven fabrics can be also produced from these viscose.

16 Claims, No Drawings

PROCESS FOR PRODUCING ARTICLES OF REGENERATED CHITIN-CHITOSAN CONTAINING MATERIAL AND THE RESULTING ARTICLES

I. BACKGROUND OF THE INVENTION (1) Field of the Invention

This invention relates to a process for producing a viscose of a material (referred to as chitin-chitosan hereinafter) having mixed structure units of chitin, which contains aminoacetyl groups, and of chitosan, which contains amino groups, on the same molecule by using chitin as a starting material. The invention also relates to clothing and the like having an improved dyeability, bio-compatibility, anti-microbial activity, and excellent bio-degradative property, such as fibers, knits and textiles, films, nonwoven fabrics, or foams composed of regenerated chitin-chitosan or a combination of regenerated chitin-chitosan and regenerated cellulose in various combination ratios which are obtained by spinning or foaming said chitin-chitosan viscose or a viscose in which said chitin-chitosan and cellulose are mixed in a desired amount or the viscose in which a foaming agent is mixed. The invention further relates to medical materials, hygienic materials, anti-microbial fibers, knits and textiles, films, nonwoven fabrics, as well as miscellaneous daily goods made from these fiber materials, foam materials, and the like.

The term "bio-compatibility" herein implies, in addition to the common meaning, that the contact of chitin-chitosan containing material with human skin enhances the biological self-defensive function of the human body through lysozyme activities.

(2) Description of the Related Art

Many attempts have been carried out to produce articles such as fibers, knits and textiles, films, nonwoven fabrics or foam materials using chitin or chitosan. The inventors of this invention have described details of the process for producing the aforementioned articles in Japan Patent Application HEI 6-252861 (referred to as the prior application of the inventors).

II SUMMARY OF THE INVENTION

Chitin or chitosan was simply processed to form fibers in the prior art and practical utilization of their characteristics was insufficient. Following the prior patent applications of the inventors, the inventors of this invention have investigated the art in detail and developed a process for producing articles which are most desirable today having bio-compatibility, anti-microbial activity and improved dye affinity that has been a characteristic of the article, thus succeeding in its industrial production.

Chitin means $\beta$-1,4-poly-N-acetyl-D-glucosamine and the acetyl groups are eliminated and converted into amino groups in chitosan as a result of hydrolysis of chitin. Chitin having acetamide groups usually exhibits cell activation effects through various means in either animals or plants. It is utilized for human beings as healthy foods or medical materials in the forms of fibers, knits and textiles, films, nonwoven fabrics or foam materials. The effect for promoting chitinase production and the effect for improving the population of soil bacteria are also observed in chitin. Although evaluations for the effect of chitosan are indefinite, it is often recognized that an increase of chitosan component enhances anti-microbial activity. We have also observed that the increase of chitosan component strengthens the anti-microbial effect of the articles.

In the continued investigation after completing the prior patent application by the investigators, it was reconfirmed that chitin-chitosan has cell activation effects and anti-microbial activity for all living things including human beings. Moreover, it may be helpful for solving the world-wide problems of pollution through the adequate degradability and the ability of activating living cells. Based on the recognitions described above, we have completed the process for producing chitin-chitosan fibers or chitin-chitosan containing fibers and its articles.

According to the present invention, de-acetylation of chitin molecules is accomplished easily by loosening the highly tight tissue of chitin through a sodium hydroxide treatment at a high temperature range of 40° C. or more to 95° C. or less (pre-immersion step developed by the inventors). This process enables adjustments to the mixing ratio between chitin and chitosan (referred to as DAC ratio) in chitin-chitosan products to a most suitable value for the present invention. Thus, the invention succeeded in improving the industrial process for producing chitin-chitosan containing viscose. The present invention also made it possible for the first time to produce chitin-chitosan containing viscose in an industrial scale, thereby enabling the production of fibers, knits and textiles, films, nonwoven fabrics or foam materials that are useful for human beings. Fibers, knits and textiles, films, nonwoven fabrics or foam materials are generally termed as articles in this invention.

III DETAILED DESCRIPTION OF THE INVENTION

The first feature of this invention comprises a process for producing chitin-chitosan containing viscose characterized in that a chitin raw material containing 0.2% by weight or less of ashes, having a viscosity of 20 to 250 CPS and having a particle diameter of 4 mm or less is used, comprising the steps of adjusting DAC ratio and degree of polymerization of said chitin material by immersing the material in 30 to 48% by weight of an aqueous solution of NaOH for 10 to 120 minutes at 40 to 95° C. (referred to as a pre-immersion step) to form a compound having a structure unit of chitin having aminoacetyl groups and a structure unit of chitosan having amino groups (referred to as chitin-chitosan hereinafter), immersing the chitin-chitosan in said aqueous solution of NaOH for 10 to 60 minutes at a reduced temperature of 30 to 70° C. to adjust NaOH content (referred to as a post-immersion step) and crushing the chitin-chitosan after compressing it into 3 to 5 times the specific weight of the chitin material; followed by subjecting to a xanthation of chitin-chitosan by introducing 30 to 80% by weight of $CS_2$ to the chitin material at 20 to 35° C. for 2 to 4 hours at a lowered pressure, and then adding 2.5 to 30 times by weight of crushed ice to the chitin material to dissolve the chitin-chitosan with stirring for 2 to 30 hours.

The second feature of this invention comprises a process for producing a fiber of chitin-chitosan alone or a fiber composed of chitin-chitosan and cellulose, characterized in that the fiber is spinned by the wet spinning method for the conventional viscose rayon by using a viscose containing chitin-chitosan alone produced by the steps according to the first feature of this invention, or by using a viscose in which chitin-chitosan and cellulose are solubilized in a desired mixing ratio by weight.

The third feature of this invention comprises a process for producing chitin-chitosan films or chitin-chitosan and cellulose mixed films, characterized in that the films are formed by a conventional viscose process for producing cellulose films using a viscose of chitin-chitosan alone produced according to the process described in the first feature of this invention or using a viscose in which chitin-chitosan and cellulose are solubilized in a desired ratio by weight followed by defoaming.

The fourth feature of this invention comprises a process for producing foam materials of chitin-chitosan or mixed foam materials of chitin-chitosan and cellulose, characterized in that the chitin-chitosan viscose, which is produced by the process according to the first feature of this invention, or a viscose produced by the process according to the second feature of this invention, in which the chitin-chitosan and cellulose are solubilized in a desired amount, is mixed with a foaming agent and spinned in a spinning bath for the cellulose viscose to produce the foam materials.

The fifth feature of this invention comprises chitin-chitosan fibers or chitin-chitosan cellulose fibers, knits and textiles, films, nonwoven fabrics or foam materials, characterized in that fibers, films or foam materials composed of chitin-chitosan or chitin-chitosan and cellulose produced by the process according to the second, third or fourth step of this invention are used for clothing, hygienic articles or miscellaneous daily goods having bio-compatibility, anti-microbial activity and good dyeability.

The chitin-chitosan raw material used has an ash content of 0.2% or less, a viscosity of 20 to 250 CPS as measured at 30° C. in a 0.4% solution of the material in N,N-dimethylacetamide/LiCl=96/4, and a particle size of 4 mm or less in diameter. Fibers, knits and textiles, films, nonwoven fabrics or foam materials having bio-compatibility, excellent anti-microbial property and good dyeability are produced using the afore-mentioned chitin-chitosan material by the following processes.

(a) Pre-immersion in an alkaline solution: The chitin-chitosan material is subjected to an alkaline adduct process at a temperature range of 40° C. to 95° C., which is a process found by the inventors for the first time and has not been used in the conventional process. A process comparable to the aging process in the rayon industry for adjusting the degree of polymerization of the chitin-chitosan material was made possible and the performance for filtration of the viscose obtained was improved by decreasing insoluble residues. The reason why this process is employed will be described hereinafter. The key point of this step is to loosen the texture of chitin-chitosan structure by treating at a high temperature, resulting in a finding that the following reactions are made easier to proceed. Thus, we have succeeded in producing fibers, knits and fabrics, films, nonwoven fabrics or foam materials having bio-compatibility, an excellent anti-microbial property and good dyeability by using the material according to the first feature of this invention by the process described above. When the ash content in the chitin material is more than 0.2%, the chitin-chitosan viscose produced contains large amount of unreacted particles which are hardly soluble and, when the viscosity is not in the range of 20 to 250 CPS or the particle size distribution is in the range of more than 4 mm, the solubility of the chitin-chitosan viscose is insufficient. In both cases, the material is not suitable for the viscose according to this invention and can not be used. Applying the pre-immersion step followed by the post-immersion step for the alkaline treatment of the chitin material enhances de-acetylation of chitin molecules, thereby making it possible to adjust the mixing ratio between chitin and chitosan (referred to as DAC ratio hereinafter) suitable for this invention in the range of 15 to 75%, preferably 18 to 70% and most preferably 25 to 70%.

(b) There are many reports describing that chitin is helpful for treating wounded portions of the body or effective for curing allergic diseases by making the human skin healthy through enhancement of the activity of lysozyme or many other effects not yet defined. It has been made clear that chitosan is effective for the anti-microbial activity typically applied to clothing and miscellaneous daily goods. The afore-mentioned object of this invention is to adjust the DAC ratio described above to the desired value for the target of final products, thereby realizing an industrial production of fibers, knits and textiles, films, nonwoven fabrics and foam materials of chitin-chitosan or chitin-chitosan and cellulose. Without the pre-immersion and post immersion steps described above, the industrial production of various chitin-chitosan containing products is difficult, although they could be produced in laboratories. Articles such as fibers, knits and textiles, films, nonwoven fabrics or foam materials having bio-compatibility, excellent anti-microbial property and good dyeability could only be produced successfully by using chitin-chitosan adjusted its DAC ratio to 15 to 75%, preferably 18 to 70% and most preferably 25 to 70% by applying pre-immersion and post-immersion steps according to this invention.

(c) In the compression step after the pre- and post-immersion steps in the alkaline solution, the temperature of the system may be at room temperature or more or, alternatively, it may be below room temperature. However, when the temperature range of the compression step is adjusted to that of the post-immersion step, a desirable compression can be accomplished. A good viscose can be produced by adjusting the concentration of chitin-chitosan and by using a suitable amount of $CS_2$.

(d) The final amount of alkaline incorporated into chitin-chitosan can be adjusted by applying the pre-immersion and post immersion steps according to this invention. In the succeeding step, $CS_2$ reacts with chitin-chitosan at the point where the alkaline attaches. The reaction may be controlled depending on the nature of the viscose desired by adjusting the amount of the alkaline adduct at a suitable temperature. The temperature at the compression step is adjusted to that of post-immersion step in the range of 30 to 70° C. depending on the nature of the viscose.

The viscose solubilized by using crushed ice may be spinned in a suitable spinning bath, or it may be used as a spinning dope in which the viscose is mixed with a cellulose viscose. The mixing may be adjusted depending on the purpose of the final product by a variety of methods. The methods of mixing to form a spinning solution may be selected from the following steps; the chitin material and a cellulose pulp is mixed and the mixture is subjected to the steps from the alkaline immersion step to the sulphidation and solubilization step to form a viscose; a mixture of an alkaline chitin-chitosan and an alkaline cellulose is subjected to the sulphidation and solubilization step to form a viscose; the chitin-chitosan xanthate and cellulose xanthate are mixed and solubilized; or a chitin-chitosan viscose and cellulose viscose are mixed together. By selecting the mixing methods described above, articles such as fibers, knits and textiles, films, nonwoven fabrics or foam materials having bio-compatibility, excellent anti-microbial property and good dyeability can be produced.

(1) Selection of the Material

Chitin has a widespread occurrence in nature as structural materials mainly in arthropods, annelida or mollusk, especially in the exo-skeleton of arthropods. The chitin material used in this invention is obtained from the legs of a species of crabs (*Beni-zuwaigani*) which were crushed into a fine powder followed by treatments with dilute hydrochloric acid and NaOH solution for a short time to remove calcium, proteins and other minor components. An example of the analytical data of the components is listed below.

| water | 5.0% |
|---|---|
| Ash | 0.08% |
| Remaining proteins | 0.05% |
| Viscosity | 450 CPS |
| Particle size | 60 mesh pass |

In measuring the viscosity at 20° C., a mixed solution of N,N-dimethylacetamide and lithium chloride is used with a concentration of the sample at 0.4%. Although the chitin material may not be necessarily obtained from *Beni-zuwaigani*, chitin obtained from that species of crab is suitable for the production of the chitin fibers according to this invention because it has a high viscosity as measured by the method described above and shows a high chemical and physical stability probably due to its tight glycosidic linkage. The fewer the amount of ashes and remaining proteins the more improved the quality of the fiber obtained, wherein the amount of 0.1% or less of the remaining proteins is preferable. While viscosity has a close relation to the nature of the fiber obtained, it can be selected at a desired value in the mixed spinning with the cellulose viscose by varying the mixing ratio of cellulose. Particle size correlates with the time necessary for converting chitin to alkaline chitin and progress of the de-acetylation reaction in the immersion steps are described below. The preferable particle size is 4 mm or less. Although the composition and property of the commercially available chitin materials change widely as described above, those having an ash content of 0.2% or less, a viscosity of 20 to 250 CPS as measured at 30° C. by using 0.4% solution in N,N-dimethylacetamide/LiCl=96/4 and particle size of 4 mm or less give preferable results and those having values outside the above standards make industrial production difficult. DAC ratio of the chitin commercially available for industrial materials is in the range of 0.5 to 10%.

(2) Pre-immersion Step

In the prior art, the immersion step in the aqueous NaOH solution was carried out at the lowest temperature possible because the purpose of this step was different from that according to this invention. The inventors of this invention, however, use an aqueous solution of NaOH with a concentration of 30 to 48% by weight and apply the immersion step at a high temperature range of 40 to 95° C. to adjust the DAC ratio depending on the production purposes. Immersion at an unprecedented high temperature range enables a sufficient additional reaction of chitin with an alkali to proceed as described below by loosening the chitin structure in addition to making it possible to select a desirable DAC ratio. The selection of the immersion conditions depends on the materials used, the quality of the expected viscose and the chitin-chitosan ratio in the final products. Using an alkaline solution of high concentration and treating at a high temperature for a long time increase the chitosan content.

(3) Post-immersion Step

The sulphidation step starts only when an alkaline attaches to chitin-chitosan. Since the addition of alkaline depends on the temperature, the temperature is selected to meet the conditions described in (4) so that a desirable alkaline addition in the succeeding steps is realized after the treatment described in (2) to proceed to the compression step. The lower and upper limits of the temperature for realizing a suitable property for the dissolution step are 30° C. and 70° C., respectively, according to this invention. Actually, this lower and upper limits are regulated by the compression step described below.

(4) Compression and Crushing Step

Among the various compression methods, the most simple and reliable method is dehydration by centrifugation. In the rayon industry, a pressing method by passing through compression rollers is used. In the case of chitin-chitosan, compression is rather difficult as compared with the case of cellulose because the native configuration of chitin-chitosan molecule is different from that of cellulose and hydrogen bonds in chitin-chitosan are very strong. In addition, chitin-chitosan itself has a higher affinity against aqueous NaOH solution than that of cellulose. An adjustment of chitin-chitosan concentration or alkaline concentration would be difficult in the viscose if the problems described above are not solved. This was one of the problem in developing a method for overcoming the difficulty in chitin-chitosan production in an industrial scale, which have been solved by the inventors by controlling the temperature at the compression step. The results of the study by the inventors made it clear that the temperature at the compression step is important to achieve the best performance even when any of the several compression methods is used. The lower limit of the compression temperature is practically room temperature while the preferable temperature is 30 to 67° C.

(5) Sulphidation Step

Xanthogenation reaction is carried out, under a similar condition as in the case of the production of cellulose viscose, by adding 30 to 80% by weight of carbon disulfide at a reduced pressure to the chitin material at a temperature of 20 to 35° C., followed by stirring for at least 2 hours. Although the amount of addition of carbon disulfide depends on the reaction condition and the size of the reaction vessel, it is usually adjusted to a range of 30 to 80% by weight. When the amount is less than 30% by weight, solubility of xanthate obtained is not so good while the amount of the addition of more than 80% by weight can not be applied in the process according to this invention because all the carbon disulfide added is not necessarily used effectively and sometimes causes super sulphidation.

(6) Solubilization Step

Usually 2.5 to 30 times by weight of crushed ice against xanthate is added depending on the nature of the viscose to be produced and the mixture is stirred for 2 hours or more, preferably 2 to 15 hours, to dissolve completely. The mechanism of dissolution is that the melting point decreases in the presence of ice, water and NaOH and hydrogen bonds in the alkaline chitin-chitosan are loosened to achieve resolution. However, the dissolution is practically made difficult when the added amount of ice is less than 2.5 times by weight of the xanthate. As for the upper limit, the addition of ice of more than 30 times by weight of xanthate is not preferable since the viscose is too diluted together with causing a over-dilution of NaOH.

(7) Filtration and Ripening Step

The filtered viscose prepared by the similar process in the conventional cellulose viscose or a mixed viscose of chitin-chitosan viscose and cellulose viscose by one of the afore-described mixing methods is homogenized and is subjected to a ripening step to reach to an adequate viscosity for spinning, film application or molding.

V EXAMPLES

This invention is further illustrated by referring to the examples, although they do not limit in any sense the scope of the invention.

Example 1

In the immersion step, 40% of an aqueous NaOH solution was applied against various kinds of chitin materials at 60° C. for 3.5 hours and the mixture was compressed and filtered to form an alkaline chitin-chitosan with a chitin-chitosan concentration of 27% and NaOH content of 32%. To alkaline chitin-chitosan was added 40% by weight of carbon disulfide against chitin and the mixture was allowed to react for 3 hours at 26 to 30° C. The properties of the viscose prepared by adding 12 times by weight of crushed ice against chitin are listed below.

| No. of Experiment | No. 1 | No. 2 | No. 3 | No. 4 |
|---|---|---|---|---|
| Particle size | less than 1 mm | less than 1 mm | less than 1 mm | 4 mm |
| Ash content | 0.0% | 0.88% | 0.04% | 0.19% |
| Viscosity of the solution (DMAC-LiCl) | 67 sec | 71 sec | 825 sec | 70 sec |
| Kw | 890 | 13,700 | — | 39,500 |
| No. of unreacted particles | small | large | mal-dissolution | large |
| DAC ratio | 55% | 59.5% | — | 56.5% |

Example 2

In this example, the same chitin material as in Example 1 was used while the conditions for preparing the slurry was changed. The material was solubilized by using 10 times by weight of crushed ice against the chitin material and by stirring for 2 hours. The experimental results are listed below.

| No. of experiment | No. 5 | No. 6 | No. 7 | No. 8 |
|---|---|---|---|---|
| Immersion temp. | 60° C. | 40° C. | 25° C. | 70° C. |
| Concentration of NaOH for immersion | 41% | 40% | 41% | 45% |
| Time | 3 hrs | 1 hr | 3 hrs | 3 hrs |
| Compression temperature (560 G) | 55° C. | 39° C. | 25° C. | 70° C. |
| Kw | 890 | 1,200 | Unable to detect | Unable to detect |
| No. of unreacted | small | small | mal-dissolution | large |
| DAC ratio | 57% | 32% | 5% | 80% |

Example 3

23 g of the chitin-chitosan viscose produced by the process according to Example 1 (chitin-chitosan content: 5%) was added into 240 g of a cellulose viscose (cellulose content: 9%) produced by the conventional method and mixed with stirring. After mixing thoroughly and homogeneously and de-foaming, the viscose obtained was spinned by the conventional spinning method for the viscose fibers to obtain composite fibers of chitin-chitosan and rayon. The characteristic values of the fibers obtained are listed below.

| Dry strength | 2.6 g/d | Dry elongation | 17.0% |
|---|---|---|---|
| Wet strength | 1.6 g/d | Wet elongation | 23.7% |
| Anti-microbial activity (shake flask method) | | | |
| Staphylococcus aureuse; | | degree of sterilization | 53% |
| Bacillus pneumoniae; | | degree of sterilization | 88% |
| Pseudomonas aeruginosa; | | degree of sterilization | 45% |

Example 4

Into 30 g of No. 1 chitin-chitosan viscose (chitin-chitosan content: 5%) prepared in Example 1 was added 30 g of neutral anhydrous sodium sulfate having a mean particle size of 3 mm and the solution was mixed homogeneously. The mixture was placed into a vessel made of wood to form a layer of 20 mm in thickness, followed by a solidification by heating with an electric current or by placing into a hot water bath. The solid obtained was placed into a spinning bath used for producing the conventional cellulose viscose fiber containing 1 liter of spinning solvent and the bath was heated to reflux for about 1 hour. After the reflux, the remaining solid was washed with warm water and then with an aqueous NaOH solution on 3% by weight in concentration. After a bleaching step, a sponge like solid was obtained. This sponge-like product had an apparent specific gravity of 0.34 and was highly hygroscopic.

Example 5

The No. 5 or No. 6 viscose produced in Example 2 was mixed with a conventional rayon viscose to adjust the proportion of the chitin-chitosan fiber of the final product to 10% by weight. The fiber spinned in a conventional spinning bath for rayon was formed into nonwoven fabrics. Determination of degree of sterilization by a shake flask method as regulated by Committee of Anti-microbial and Deodorant Finishing for Textile, Japan (Seni Seihin Eisei Kakoh Kyougikai: SEK) showed higher effects in the products having higher DAC ratio.

| | Degree of sterilization |
|---|---|
| No. 5 (DAC ratio: 57%) | 94% |
| No. 6 (DAC ratio: 32%) | 48% |

*E. coli* IFO No. 3301 was used for the test bacteria.

VI Effect of the Invention (a) According to the present invention, a viscose of chitin-chitosan can be produced by using conventional viscose production facilities with some improvements in cellulose viscose production process. From this chitin-chitosan viscose were produced. After mixing with a cellulose viscose by the various mixing method described hitherto, chitin fibers, chitin films or sponge like solids can be applied for various use. Industrial production of chitin-chitosan viscose was made possible from the commercially available chitin material by adjudging its degree of polymerization in the immersing step, by adjusting its DAC ratio depending on the final use of the product or by controlling the temperature of the alkaline solution at the compression step.

(b) Chin-chitosan can be arbitrarily mixed with cellulose in their raw materials or in the steps of alkaline addition, xanthate formation or viscose formation.

(c) The chitin-chitosan fibers or films according to this invention are especially excellent in their anti-microbial activity. As are shown in Example 3, the chitin-chitosan and natural rayon mixed fibers showed a degree of sterilization of 53% for *Staphylococcus aureuse*, 88% for *Bacillus pneumoniae* and 45% for *Pseudomonas aeruginosa* before washing, which are the values that meet well to the standards of SKE (not less than 26%).

(d) Besides anti-microbial activity, the chitin-chitosan fibers or films, or complexed fibers or films of chitin-chitosan and cellulose, are useful for their better dyeability to acidic dyes by taking advantage of the cationic nature of chitin-chitosan as compared with the fibers or films obtained from the conventional cellulose viscose. This cationic nature is applicable, not only for fibers having dye affinity, but also for fibers having various chemically capturing activity (absorptivity or reactivity).

(e) The Chitin-chitosan fibers according to this invention (having cellulose content of 0 to 100%) can be used not only by itself but also by being blended or blended and woven with natural fibers like silk, cotton, flax or wool, or regenerated fibers, man-made fibers, or synthetic fibers like polyester, nylon, acrylic fibers.

(f) The chitin-chitosan fibers or articles according to this invention can be effectively used for deodorizing materials or growth accelerating agents for plants.

(g) The chitin-chitosan/cellulose fibers or films are applicable for nonwoven fabrics, films as well as for textiles like spinning fibers, clothing or knits. The nonwoven fabrics, foam materials or films can be used for clothing like surgical wears having an anti-microbial activity, daily miscellaneous goods such as diapers having an anti-inflammation effect or wet tissue papers having an anti-microbial activities, agricultural goods like films having a soil-reforming effect, bed-mats like a cushion for preventing frictional inflammation, industrial materials like filters having an anti-microbial activity, or medical materials.

(h) The composite sponge of chitin-chitosan/cellulose according to this invention can be used for toiletries like a sponge for washing the face and body.

(i) Knits and textiles of chitin-chitosan/cellulose can be used for clothing like undershirts, socks or T-shirts, bedroom commodities like pajamas, bed covers or cushions, miscellaneous dairy goods like towels, slippers or cloth bags, or medical materials like gauzes, bandages, stapes or plasters.

What we claim is:

1. A process for producing a chitin-chitosan viscose comprising:

immersing a starting chitin material containing 0.2% by weight or less of ash, having a viscosity of 20 to 250 CPS and having a particle diameter of 4 mm or less in 30 to 48% by weight of an aqueous solution of NaOH for a period of 10 to 300 minutes at a temperature from 40 to 95° C. to adjust a DAC ratio and degree of polymerization of the chitin material and to form chitin-chitosan, immersing the chitin-chitosan in said aqueous solution of NaOH for a period of 10 to 60 minutes at a reduced temperature from 30 to 70° C. to adjust a NaOH content of the chitin-chitosan, compressing the chitin-chitosan to 3 to 5 times the specific weight of the starting chitin material, crushing the chitin-chitosan, adding 28 to 80% by weight of $CS_2$ based on the weight of the starting chitin material to the chitin-chitosan at a temperature from 20 to 35° C. for 2 to 4 hours at a lower pressure to subject the chitin-chitosan to a xanthogenation reaction, adding 2.5 to 30 times by weight of crushed ice based on the weight of the starting chitin material to the chitin-chitosan, and stirring the crushed ice and chitin-chitosan for 2 to 30 hours to dissolve the chitin-chitosan to produce the chitin-chitosan viscose.

2. A process for producing a chitin-chitosan fiber comprising spinning the chitin-chitosan viscose produced by the process in claim 1 with a wet spinning method to produce the chitin-chitosan fiber.

3. A process for producing a chitin-chitosan and cellulose mixed fiber comprising:

solubilizing chitin-chitosan produced by the process in claim 1 and cellulose to a desired mixing ratio by weight to produce a chitin-chitosan and cellulose viscose and spinning the chitin-chitosan and cellulose viscose with a wet spinning method to produce the chitin-chitosan and cellulose mixed fiber.

4. A process for producing a chitin-chitosan film comprising:

forming the chitin-chitosan film from the chitin-chitosan viscose produced by the process in claim 1.

5. A process for producing a chitin-chitosan and cellulose mixed film comprising:

solubilizing chitin-chitosan produced by the process in claim 1 and cellulose to a desired mixing ratio by weight to produce a chitin-chitosan and cellulose viscose, defoaming the chitin-chitosan and cellulose viscose, and forming the chitin-chitosan and cellulose mixed film from the defoamed chitin-chitosan and cellulose viscose.

6. A process for producing a chitin-chitosan foam material comprising:

mixing the chitin-chitosan viscose produced by the process in claim 1 with a foaming agent and spinning the mixture in a spinning bath to produce the chitin-chitosan foam material.

7. A process for producing a mixed chitin-chitosan and cellulose foam material comprising:

solubilizing chitin-chitosan produced by the process in claim 1 and cellulose to a desired mixing ratio by weight to produce a chitin-chitosan and cellulose viscose, mixing the chitin-chitosan and cellulose viscose with a foaming agent, and spinning the mixture in a spinning bath to produce the mixed chitin-chitosan and cellulose foam material.

8. The chitin-chitosan fiber produced by the process of claim 2.

9. The chitin-chitosan and cellulose mixed fiber produced by the process of claim 3.

10. The chitin-chitosan film produced by the process of claim 4.

11. The chitin-chitosan and cellulose mixed film produced by the process of claim 5.

12. The chitin-chitosan foam material produced by the process of claim 6.

13. The mixed chitin-chitosan and cellulose foam material produced by the process of claim 7.

14. The chitin-chitosan fiber according to claim 8 wherein the fiber is in the form of a knit, textile or fabric.

15. The chitin-chitosan and cellulose mixed fiber according to claim 9 wherein the fiber is in the form of a knit, textile or fabric.

16. The chitin-chitosan according to claim 1 comprising a chitin to chitosan ratio of 25% to 75%.

* * * * *